(12) United States Patent
Baraka et al.

(10) Patent No.: US 10,505,418 B2
(45) Date of Patent: Dec. 10, 2019

(54) ROTOR OF A ROTARY ELECTRICAL MACHINE PROVIDED WITH PARTS FOR RETENTION OF PERMANENT MAGNETS

(71) Applicant: Valeo Equipements Electriques Moteur, Creteil (FR)

(72) Inventors: Khadija El Baraka, Creteil (FR); Svetislav Jugovic, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 98 days.

(21) Appl. No.: 15/922,108

(22) Filed: Mar. 15, 2018

(65) Prior Publication Data

US 2018/0269736 A1    Sep. 20, 2018

(30) Foreign Application Priority Data

Mar. 15, 2017    (FR) ..................................... 17 52089

(51) Int. Cl.
*H02K 1/27*        (2006.01)
*H02K 1/28*        (2006.01)
(Continued)

(52) U.S. Cl.
CPC ................. *H02K 1/28* (2013.01); *H02K 1/02* (2013.01); *H02K 1/2766* (2013.01); *H02K 3/04* (2013.01); *H02K 15/03* (2013.01)

(58) Field of Classification Search
CPC    H02K 1/28; H02K 1/02; H02K 15/03; H02K 3/04; H02K 1/2766
See application file for complete search history.

(56) References Cited

U.S. PATENT DOCUMENTS 5,159,220 A  *  10/1992  Kliman ................ H02K 1/2766
                                                    310/156.56
8,400,042 B2 *   3/2013  Xu ......................... H02K 3/487
                                                         310/214
(Continued)

FOREIGN PATENT DOCUMENTS

DE     102012016927 A1    2/2014
DE     102013206436 A1   10/2014
(Continued)

*Primary Examiner* — Naishadh N Desai
(74) *Attorney, Agent, or Firm* — Osha Liang LLP

(57) ABSTRACT

The invention relates mainly to a rotary electrical machine comprising a rotor (10) provided with a body (12) with an axis (X), the rotor body (12) comprising a plurality of longitudinal cavities (16) each designed to receive at least one permanent magnet (13);

magnetic poles each formed by the permanent magnets (13) accommodated in two adjacent cavities (16) forming a "V" on a plane (P) orthogonal to the axis (X) of the rotor body (12);

the rotor (10) comprising at least one part (35) for retention of the permanent magnets (13) in the cavities (16), characterised in that the retention part (35) comprises two elongate strips (36), each strip (36) comprising at least one boss (37) which is designed to apply a force of retention of the corresponding permanent magnet (13) in the cavity (16), and in that the retention part (35) additionally comprises at least two connection arms (40) between the two strips (36), with the boss (37) extending axially between the two connection arms.

10 Claims, 3 Drawing Sheets

(51) Int. Cl.
*H02K 15/03* (2006.01)
*H02K 3/04* (2006.01)
*H02K 1/02* (2006.01)

(56) References Cited

U.S. PATENT DOCUMENTS

| | | | | |
|---|---|---|---|---|
| 2008/0036336 A1* | 2/2008 | Salem | .................... | H02K 11/20 |
| | | | | 310/68 B |
| 2009/0033167 A1* | 2/2009 | Bradfield | ............. | H02K 21/044 |
| | | | | 310/156.23 |
| 2014/0252892 A1* | 9/2014 | De Filippis | .......... | H02K 1/2773 |
| | | | | 310/51 |

FOREIGN PATENT DOCUMENTS

| | | | |
|---|---|---|---|
| FR | 3028360 | A1 | 5/2016 |
| WO | 13057673 | A2 | 4/2013 |
| WO | 13175117 | A1 | 11/2013 |

\* cited by examiner

ROTOR OF A ROTARY ELECTRICAL MACHINE PROVIDED WITH PARTS FOR RETENTION OF PERMANENT MAGNETS

The invention relates to a rotor of a rotary electrical machine provided with parts for retention of permanent magnets.

In a manner which in itself is known, rotary electrical machines comprise a stator and a rotor integral with a shaft. The rotor can be integral with a drive shaft and/or a driven shaft, and can belong to a rotary electrical machine in the form of an alternator, an electric motor, or a reversible machine which can function in both modes.

The stator is fitted in a housing which is configured to rotate the shaft on bearings by means of roller bearings. The rotor comprises a body formed by a stack of metal plate sheets which are retained in the form of a set by means of an appropriate securing system.

The stator comprises a body constituted by a stack of thin metal plates forming a ring, the inner face of which is provided with notches open towards the interior in order to receive phase windings. The phase windings are obtained for example from a continuous wire covered with enamel, or from conductive elements in the form of pins which are connected to one another by welding. These windings are polyphase windings connected in the form of a star or a triangle, the outputs of which are connected to an inverter which also functions as a rectifier bridge.

In addition, the rotor can comprise a body formed by a set of metal plates made of a magnetic material, in particular of steel, as well as by poles formed by a plurality of permanent magnets accommodated in cavities in the body. When the production tolerances are large in order to reduce the manufacturing costs, it is possible for the magnets to be badly placed inside the cavities in the rotor.

As illustrated in FIG. 1, in order to retain the magnets inside the rotor 1, it is known to insert in each cavity 2 designed to accommodate the magnets 3 a flexible strip 4 which exerts a retention force on the corresponding magnets 3. However, a device of this type is not optimal during the assembly operation when the cavities 2 in the rotor have a complex profile.

The objective of the invention is to eliminate this disadvantage efficiently by proposing a rotary electrical machine comprising a rotor provided with a body with an axis, the rotor body comprising a plurality of longitudinal cavities each designed to receive at least one permanent magnet;
magnetic poles each formed by the permanent magnets accommodated in two adjacent cavities forming a "V" on a plane orthogonal to the axis of the rotor body;
the rotor comprising at least one part for retention of the permanent magnets in the cavities,
characterised in that the retention part comprises two elongate strips, each strip comprising at least one boss which is designed to apply a force of retention of the corresponding permanent magnet in the cavity, and in that the retention part additionally comprises at least two connection arms between the two strips, with the boss extending axially between the two connection arms.

The invention thus makes it possible to facilitate the positioning of the retention parts inside cavities which have a configuration in the form of a "V" compared with retention parts with a single strip. The invention also makes it possible to limit the loss of material during the cutting of metal plate in order to produce the retention parts.

According to one embodiment, the retention force is applied by the boss on the corresponding permanent magnet in the direction of an outer periphery of the rotor body.

According to one embodiment, at least one strip of the retention part comprises a lug for abutment against an end face of the rotor body.

According to one embodiment, each strip of the retention part comprises a spring for application of an axial retention force of the permanent magnet in the corresponding cavity.

According to one embodiment, the retention part comprises a plurality of bosses provided in each strip.

According to one embodiment, the retention part comprises the same number of bosses on each strip.

According to one embodiment, the retention part comprises axial alternation of bosses and connection arms.

According to one embodiment, the connection arms extend transversely relative to a direction of longitudinal extension of the said retention part.

According to one embodiment, the connection arms are situated inside an area of joining between the two cavities.

According to one embodiment, the two strips of the retention part are free at their ends.

The invention will be better understood by reading the following description and examining the figures which accompany it. These figures are provided purely by way of illustration of the invention and are in no way limiting.

FIG. 1, already described, is an exploded view in perspective of a rotor of a rotary electrical machine comprising magnets introduced into longitudinal cavities in the said stator and retained by flexible plates according to the prior art;

Elements which are identical, similar or analogous retain the same reference from one figure to another.

Figure 2:
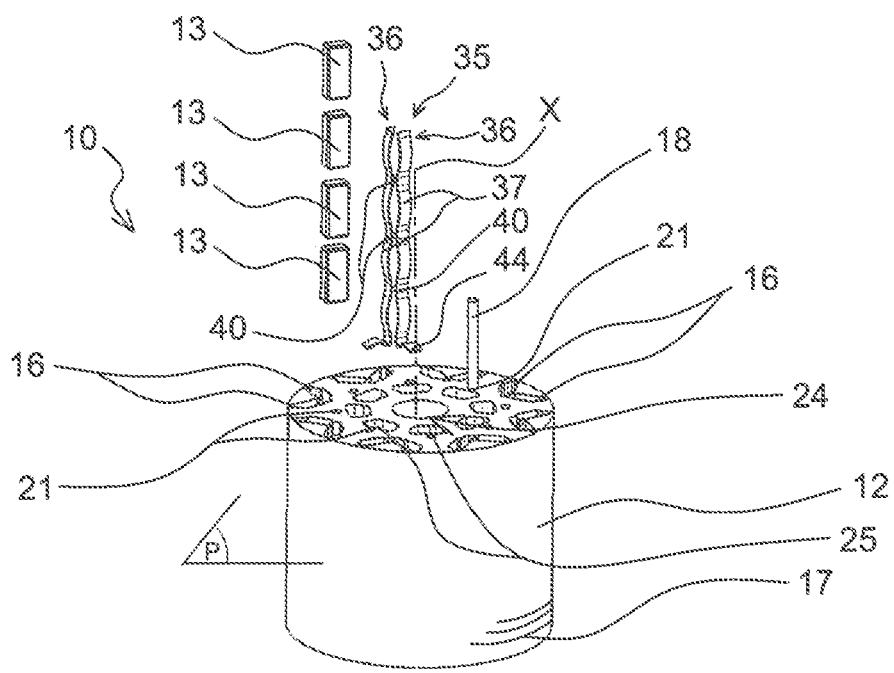
FIG. 2 is an exploded view in perspective of a rotor of a rotary electrical machine according to the present invention.
Figure 4:
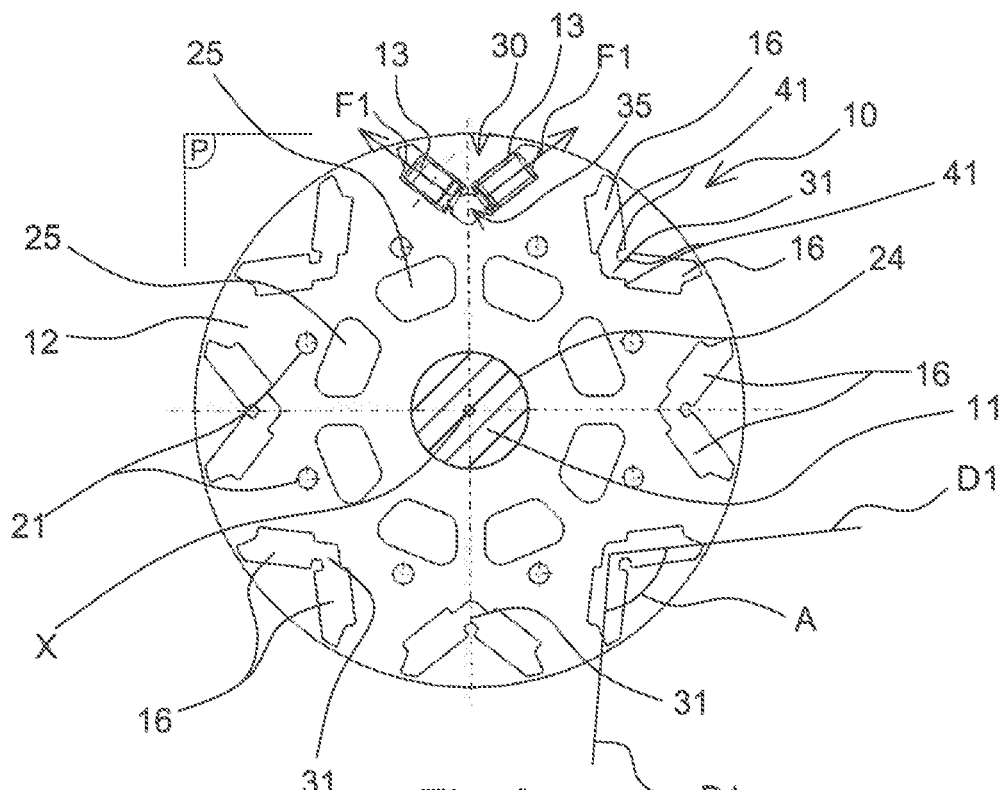
FIG. 4 is a view in cross-section of a rotor of a rotary electrical machine according to the present invention, illustrating the fitting of a retention part inside two adjacent cavities arranged in the form of a "V"

FIGS. 2 and 4 show a rotor 10 fitted on a shaft 11 comprising a body 12 formed by a set of plates produced from a magnetic material, in particular steel, as well as a plurality of permanent magnets 13, which are designed to be accommodated in cavities 16 in the body 12. The metal plates 17 of the set which are stacked axially can be retained by means of rivets 18 passing axially through the rotor 10 from one side to the other via securing holes 21. The rotor body 12 with an axis X comprises a central opening 24 for the passage of the shaft 11 extending according to the axis X. The shaft 11 can be force fitted inside the opening 24, in order to connect the rotor body 12 and the shaft 11 in rotation.

The rotor body 12 also comprises recesses 25 in order to lighten the rotor 10. Certain recesses 25, for example one out of two, can be used for securing of flanges 27 on the ends of the rotor 10 body 12, such as the one shown in FIG. 1.

More specifically, on a cross-sectional plane P orthogonal to the axis X, the cavities 16 extend longitudinally according to a direction D1. The cavities 16 can be through cavities axially, or they can have a blind configuration. The magnetic poles 30 of the rotor 10 are each formed by the magnets 13 accommodated in two adjacent cavities 16 forming a "V" on the orthogonal plane P. In other words, the directions D1 of longitudinal extension of two adjacent cavities 16 form an angle A which is not zero relative to one another, as shown in FIG. 4. The two adjacent cavities 16 are connected to one another by a joining area 31 which extends axially at the tip of the profile in the form of a "V".

As can be seen in FIG. 2, each cavity 16 receives a plurality of magnets 13 which are stacked axially on one another. In this case, each cavity 16 receives four magnets 13 with a parallelepiped form. It will be appreciated that, as a variant, the number of magnets 13 can be different. A single magnet 13 can also be inserted inside each cavity 16. The permanent magnets 13 can be made of rare earth or ferrite, according to the applications and power required from the machine.

The magnets 13 are retained in position inside the cavities 16 by means of retention parts 35. A single retention part 35 makes it possible to retain the magnets 13 situated in two adjacent cavities 16.

Figure 3:
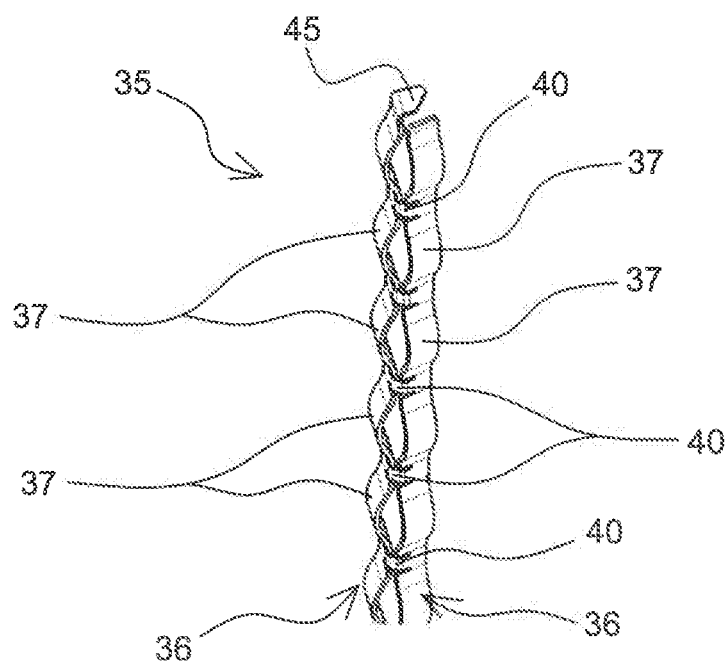
FIG. 3 is a view in perspective of a part for retention of permanent magnets according to the present invention.

For this purpose, as illustrated in FIGS. 2 and 3, the retention part 35 comprises two elongate strips 36 which are each inserted inside a corresponding cavity 16. Each strip 36 is provided with a plurality of bosses 37 which are designed to apply a retention force F1 of the magnet 13 in the cavity 16, as shown in FIGS. 4 and 5.

The retention part 35 also comprises arms 40 for connection between the two strips 36. The connection arms 40 extend transversely relative to the direction of axial extension of the strips 36. Each boss 37 extends axially relative to the axis X, between two connection arms 40. There is therefore axial alternation between the connection arms 40 and the bosses 37. The retention part 35 comprises the same number of bosses 37 on each strip 36, i.e. four (one for each magnet 13 accommodated in the corresponding cavity 16).

In this case, as can be seen in FIG. 4, the retention force F1 is applied by each boss 37 on a corresponding magnet 13 in the direction of an outer periphery of the rotor body 12. For this purpose, each strip 36 is situated on the inner periphery side of the rotor 10, and is interposed between the magnet 13 and an inner support face 41 of the cavity 16 facing towards the outer periphery of the rotor body 12. Each boss 37 is compressed and applied by reaction on a magnet 13, corresponding to a force F1 according to a direction which is parallel to the longitudinal direction D1 of the cavity 16.

Figure 5:
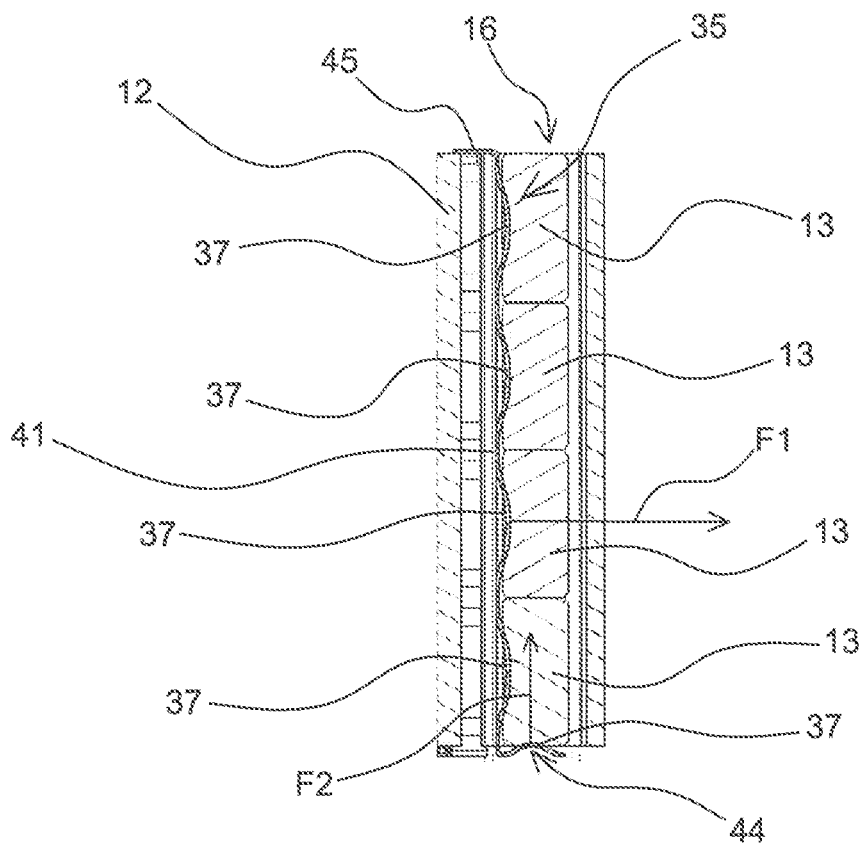
FIG. 5 is a view in cross-section of a strip of the retention part according to the invention inserted in a cavity in the rotor.

In addition, each strip 36 comprises a spring 44 for application of an axial retention force F2 on the stack of magnets 13 inside the corresponding cavity 16, as illustrated by FIG. 5. Each spring 44 is constituted by a rim which extends substantially perpendicularly relative to the direction of longitudinal extension of the corresponding strip 36. Each spring 44 is provided with a boss 37, which is designed to be compressed between an end magnet 13 of the stack and an end flange 27, for application by reaction of the axial retention force F2.

Preferably, at least one strip 36 of the retention part 35 comprises a lug 45 for abutment against an end face of the rotor body 12, as shown in FIGS. 3 and 5. This therefore makes it possible to retain in position the part 35 for retention of the magnets 13 during the fitting of the rotor.

The two strips 36 are free at their ends, i.e. they are not connected to one another by connection arms 40 at their end.

Figure 6:
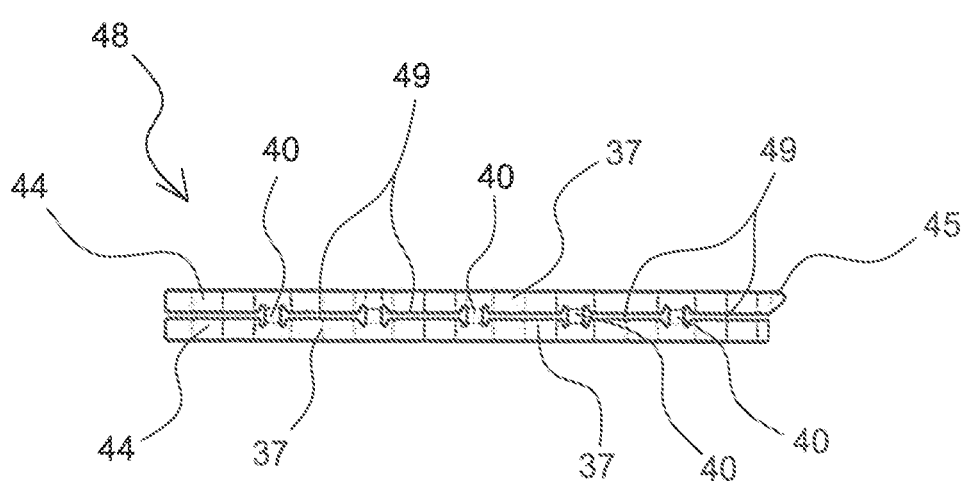
FIG. 6 is a view from above of the plate of cut-out material from which the retention part according to the present invention is produced.

A description is provided hereinafter of the method for manufacturing of the retention parts 35 formed from an elongate metal plate 48 shown in FIG. 6. Longitudinal cut-outs 49 are provided by means of cutting out from the median part of the plate 48 at regular intervals, in order to delimit the strips 36 and the connection arms 40. Bosses 37 are produced in the areas which separate two successive connection arms 40.

One of the ends of each strip 36 which supports a boss 37 is folded back in order to form the spring 44, whereas the other end is folded back in order to form the abutment lug 45. In order to facilitate the folding, the retention part 35 can comprise a folding area constituted by a local thinning of material or two notches provided in the edges of the strips 36.

Each retention part 35 is inserted inside corresponding cavities 16 in the form of a "V", such that each strip 36 is supported against a support face 41 shown in FIG. 4, in order to apply the retention force F1 on the magnets 13. The connection arms 40 are inserted inside the joining area 31 between the two cavities 16.

Figure 1:
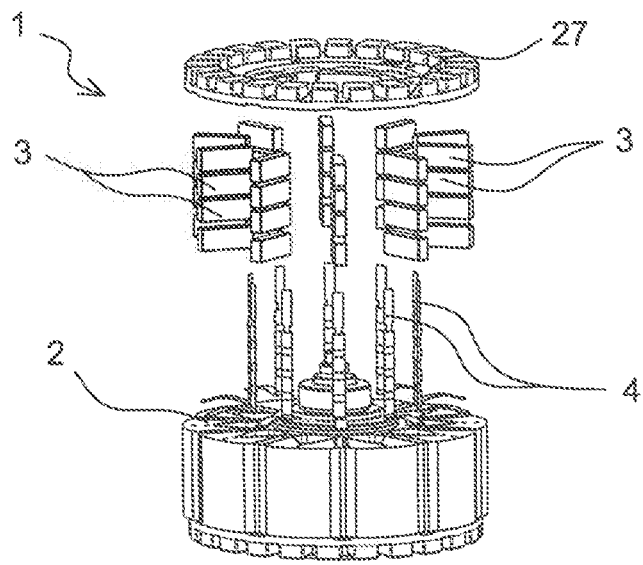

Two flanges 27, which are advantageously made of non-magnetic steel, such as the one shown in FIG. 1, are positioned at each axial end of the body 12, in order to ensure retention of the magnets 13 inside the cavities 16 and balancing of the rotor 10. Securing units, such as screws, are inserted in some of the recesses 25, in order to ensure the securing of the flanges.

In addition, the rotary electrical machine can comprise a stator (not represented) surrounding the rotor 10 with the presence of an air gap. This stator comprises a body constituted by a stack of thin metal plates forming a ring, the inner face of which is provided with notches open towards the interior in order to receive phase windings. The phase windings are obtained for example from a continuous wire covered with enamel, or from conductive elements in the form of pins connected to one another by welding. These windings are polyphase windings connected in the form of a star or a triangle, the outputs of which are connected to an inverter which also functions as a rectifier bridge.

It will be appreciated that the preceding description has been provided purely by way of example, and does not limit the scope of the invention, a departure from which would not be constituted by replacement of the different elements by any other equivalents.

In addition, the different characteristics, variants, and/or embodiments of the present invention can be associated with one another according to different combinations, provided that they are not incompatible with one another or mutually exclusive.

The invention claimed is:

1. A rotary electrical machine comprising:
    a rotor provided with a body with an axis, the rotor body comprising a plurality of longitudinal cavities each for receiving at least one permanent magnet; and
    magnetic poles each formed by the permanent magnets accommodated in two adjacent cavities forming a "V" on a plane orthogonal to the axis of the rotor body,
    the rotor comprising at least one part for retention of the permanent magnets in the cavities,
    wherein the retention part comprises two elongate strips, each strip comprising at least one boss which applies a force of retention of the corresponding permanent magnet in the cavity, and
    wherein the retention part additionally comprises at least two connection arms between the two strips, with the boss extending axially between the two connection arms.

2. The rotary electrical machine according to claim 1, wherein the retention force is applied by the boss on the corresponding permanent magnet in the direction of an outer periphery of the rotor body.

3. The rotary electrical machine according to claim 1, wherein at least one strip of the retention part comprises a lug for abutment against an end face of the rotor body.

4. The rotary electrical machine according to claim 1, wherein each strip of the retention part comprises a spring for application of an axial retention force of the permanent magnet in the corresponding cavity.

5. The rotary electrical machine according to claim 1, wherein the retention part comprises a plurality of bosses provided in each strip.

6. The rotary electrical machine according to claim 5, wherein the retention part comprises the same number of bosses on each strip.

7. The rotary electrical machine according to claim 5, wherein the retention part comprises axial alternation of bosses and connection arms.

8. The rotary electrical machine according to claim 1, wherein the connection arms extend transversely relative to a direction of longitudinal extension of the said retention part.

9. The rotary electrical machine according to claim 1, wherein the connection arms are situated inside an area of joining between the two cavities.

10. The rotary electrical machine according to claim 1, wherein the two strips of the retention part are free at their ends.

\* \* \* \* \*